(12) United States Patent
Guez et al.

(10) Patent No.: US 10,296,967 B1
(45) Date of Patent: *May 21, 2019

(54) SYSTEM, METHOD, AND COMPUTER PROGRAM FOR AGGREGATING FALLOUTS IN AN ORDERING SYSTEM

(71) Applicant: Amdocs Software Systems Limited, Dublin (IE)

(72) Inventors: Yoav Guez, Carmiel (IL); Yakov Eini, Modiin (IL); Tomer Sadan, Tel-Mond (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 203 days.

This patent is subject to a terminal disclaimer.

(21) Appl. No.: 15/491,798

(22) Filed: Apr. 19, 2017

Related U.S. Application Data

(63) Continuation of application No. 14/183,431, filed on Feb. 18, 2014, now Pat. No. 9,659,324.

(60) Provisional application No. 61/816,748, filed on Apr. 28, 2013.

(51) Int. Cl.
  *G06Q 30/00* (2012.01)
  *G06Q 30/06* (2012.01)
  *G06F 16/903* (2019.01)

(52) U.S. Cl.
  CPC ... *G06Q 30/0635* (2013.01); *G06F 16/90335* (2019.01); *G06Q 30/0601* (2013.01); *G06Q 30/0641* (2013.01)

(58) Field of Classification Search
  CPC ............ G06Q 30/0601–30/0645; G06Q 30/08
  USPC ................................................ 705/26.1–27.2
  See application file for complete search history.

(56) References Cited

PUBLICATIONS

"Order Fallout Management", 2013, Oracle Communications Order and Service Management Concepts Release 7.2.2 captured on Sep. 15, 2013 at [https://web.archive.org/web/20130915091449/https://docs.oracle.com/cd/E35413_01/doc.722/e35415/cpt_order_fallout.htm] (Year: 2013).*

* cited by examiner

*Primary Examiner* — Resha Desai
*Assistant Examiner* — Lindsey B Smith
(74) *Attorney, Agent, or Firm* — Zilka-Kotab, P.C.

(57) ABSTRACT

A system, method, and computer program product are provided for aggregating fallouts in an ordering system. In use, a repository of fallout errors associated with an ordering system is maintained. Further, one or more fallout events associated with the ordering system are automatically detected. Additionally, it is determined that the one or more detected fallout events are associated with at least one fallout error associated with processing an order in the ordering system. Furthermore, it may be determined whether the at least one fallout error corresponds to one of a plurality of stored fallout errors stored in the repository of fallout errors, in response to determining that the one or more detected fallout events are associated with the at least one fallout error from processing an order in the ordering system.

6 Claims, 5 Drawing Sheets

SYSTEM, METHOD, AND COMPUTER PROGRAM FOR AGGREGATING FALLOUTS IN AN ORDERING SYSTEM

CLAIM OF PRIORITY

This application is a continuation of U.S. application Ser. No. 14/183,431, filed Feb. 18, 2014, which claims the benefit of U.S. Provisional Application No. 61/816,748, filed Apr. 28, 2013, the entire contents of which are incorporated herein by reference.

FIELD OF THE INVENTION

The present invention relates to telecommunication industry service orders, and more particularly to ordering systems associated with such flow and activities.

BACKGROUND

Service providers (SPs) must execute business processes on time and provide efficient and cost-effective customer service. Market statistics and experience from actual accounts provide valuable information on real customer issues and needs, with regard to the operation area. Tier 1 and Tier 2 customers invest an enormous number of full time employees and significant operations resources into fallout management. Sustainable business service solutions and structured methodologies for resolving fallout issues reduces customer churn, enhances satisfaction, and improves customer experience.

Telecommunication service providers typically have complicated ordering systems that typically involve many systems and activities, ranging from order capture through service activation. There is thus a need for addressing these and/or other issues associated with the prior art.

SUMMARY

A system, method, and computer program product are provided for aggregating fallouts in an ordering system. In use, a repository of fallout errors associated with an ordering system is maintained. Further, one or more fallout events associated with the ordering system are automatically detected. Additionally, it is determined that the one or more detected fallout events are associated with at least one fallout error associated with processing an order in the ordering system. Furthermore, it may be determined whether the at least one fallout error corresponds to one of a plurality of stored fallout errors stored in the repository of fallout errors, in response to determining that the one or more detected fallout events are associated with the at least one fallout error from processing an order in the ordering system.

DETAILED DESCRIPTION

Figure 1:
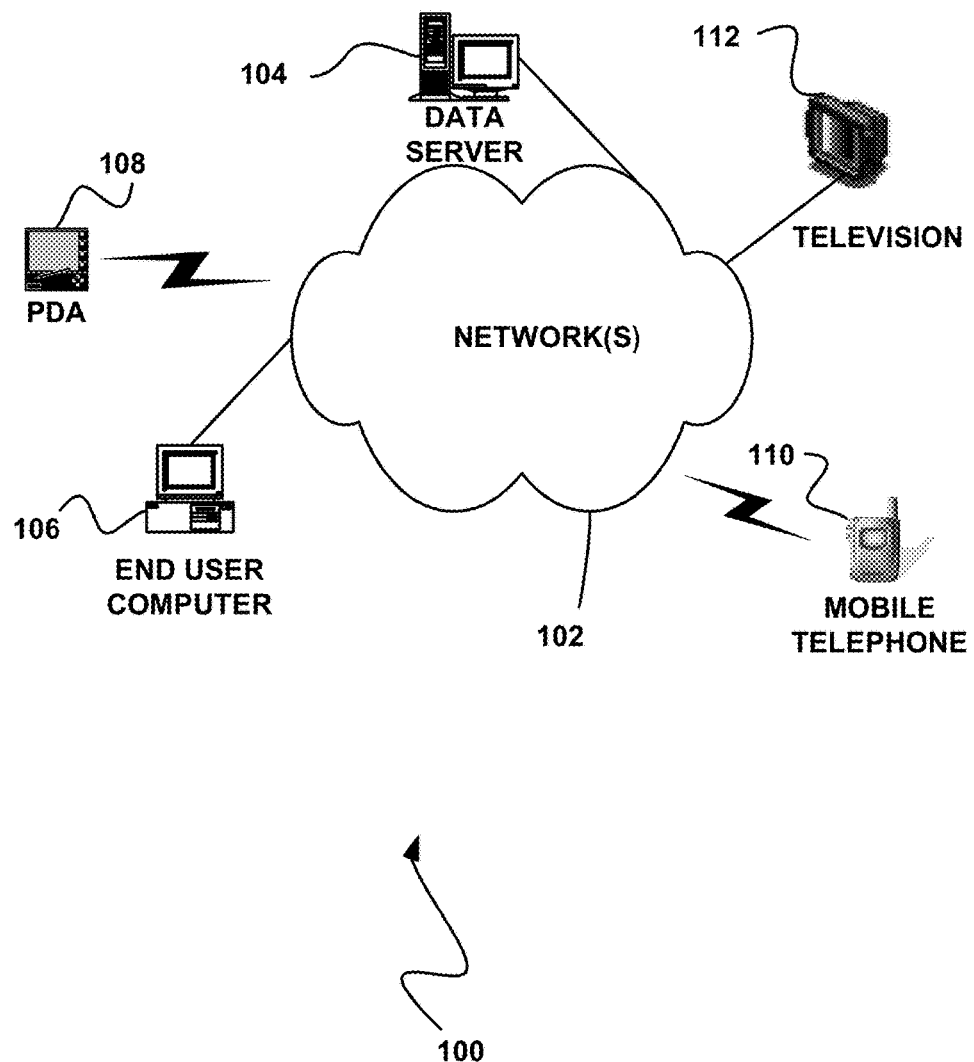
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
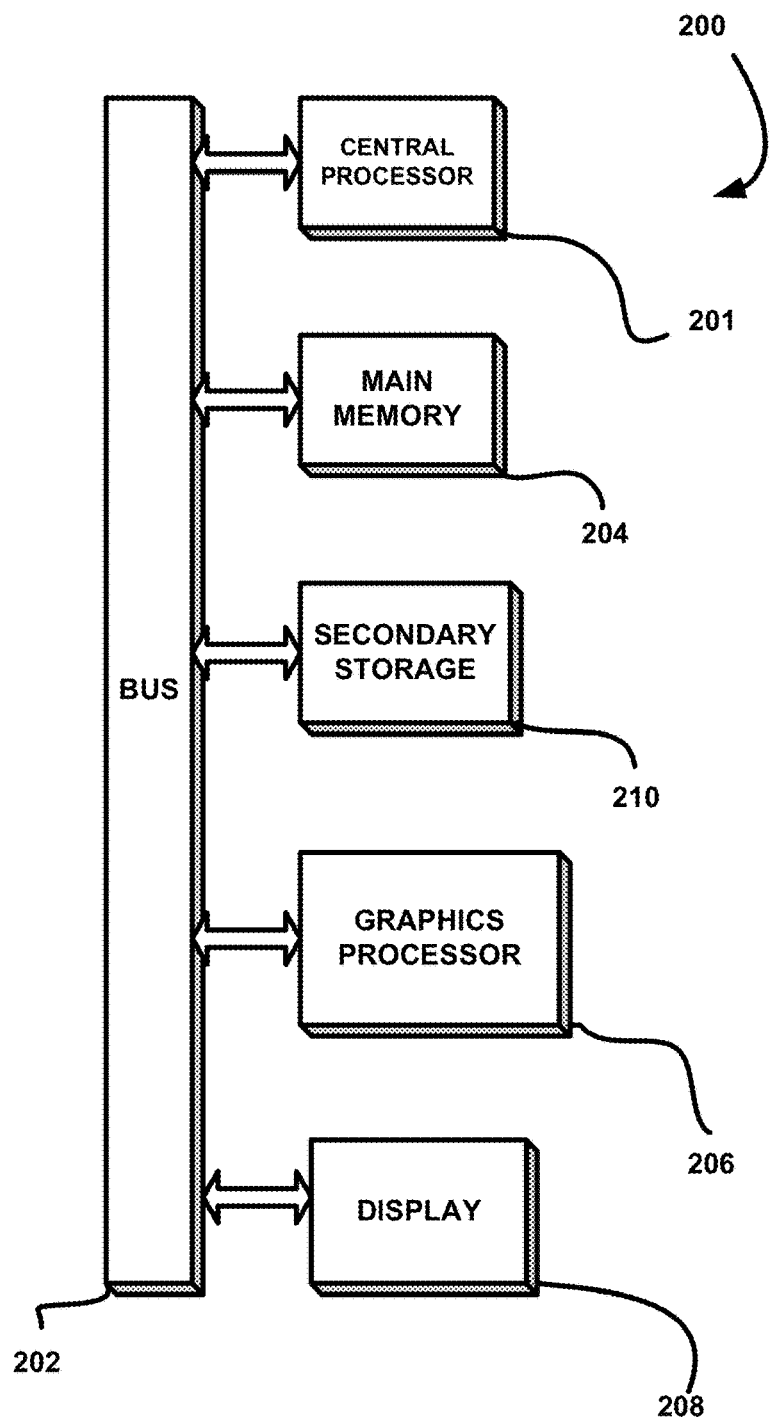
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
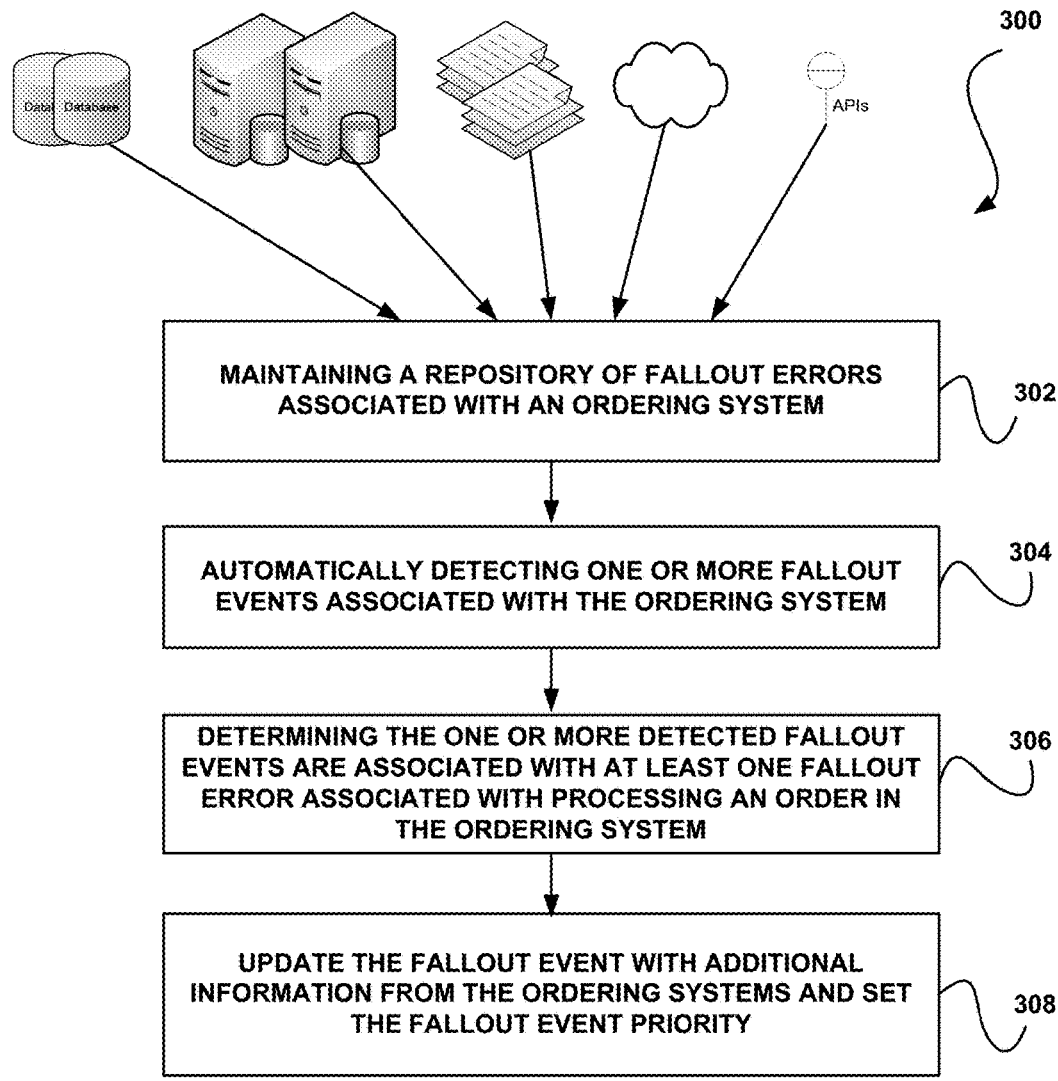
FIG. 3 illustrates a method for aggregating fallouts in an ordering system, in accordance with one embodiment.

FIG. 3 illustrates a method 300 for aggregating fallouts in an ordering system, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a repository of fallout errors associated with at least one ordering system is maintained. See operation 302. In the context of the present description, a fallout error refers to any error associated with an ordering system that prevents an order from being completed and/or activated.

The ordering system may include any ordering system associated with a service and/or product. For example, in one embodiment, the ordering system may include an ordering system associated with a consumer telecommunications network provider.

Additionally, the repository may include any memory and/or database, etc. In various embodiments, maintaining the repository of fallout errors may include utilizing the repository, updating the repository, populating the repository, and/or various other activities. The repository of fallout errors may include various information, including information associated with a plurality of fallout errors. Fallout errors may include any information associated with a fallout.

As shown further in FIG. 3, one or more fallout events associated with the ordering system are automatically detected. See operation 304. In the context of the present description, fallout events refer to any event that capable of causing a fallout error.

The fallout events may be detected utilizing a variety of techniques. For example, the ordering system may be monitored to automatically detect the one or more fallout events associated with the ordering system. As an example, in one embodiment, one or more software agents may be utilized to monitor the ordering system to automatically detect the one or more fallout events.

As another example, a log file and/or an error file associated with the ordering system may be monitored to automatically detect the one or more fallout events. In another embodiment, one or more database tables associated with the ordering system may be monitored to automatically detect the one or more fallout events. In another embodiment, periodic testing may be utilized to monitor the ordering system to automatically detect the one or more fallout events. In another embodiment, monitoring the ordering system may include invoking one or more APIs for querying information to automatically detect the one or more fallout events.

With further reference to FIG. 3, it is determined that the one or more detected fallout events are associated with at least one fallout error associated with processing an order in the ordering system. See operation 306.

Additional information will be updated on the fallout event and stored in the repository according to pre configuration parameters that will set the fallout severity priority. See operation 308.

In one embodiment, at least one fallout error does not correspond to one of the plurality of stored fallout errors stored in the repository of fallout errors. In this case, in one embodiment, at least one administrator may be alerted of at least one fallout error (e.g. an administrator associated with the ordering system, etc.). For example, an error message may be sent to the administrator. As another example, a form indicating the error may be sent to the administrator.

In one embodiment, the information may include any information associated with the fallout error. For example, in one embodiment, the information may include order information associated with the at least one fallout error. In various embodiments, the order information may include a customer ID, a customer name, and/or a service type, etc. Further, in one embodiment, a unique fallout ID may be generated for the at least one fallout error and storing the unique fallout ID in the repository of fallout errors.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
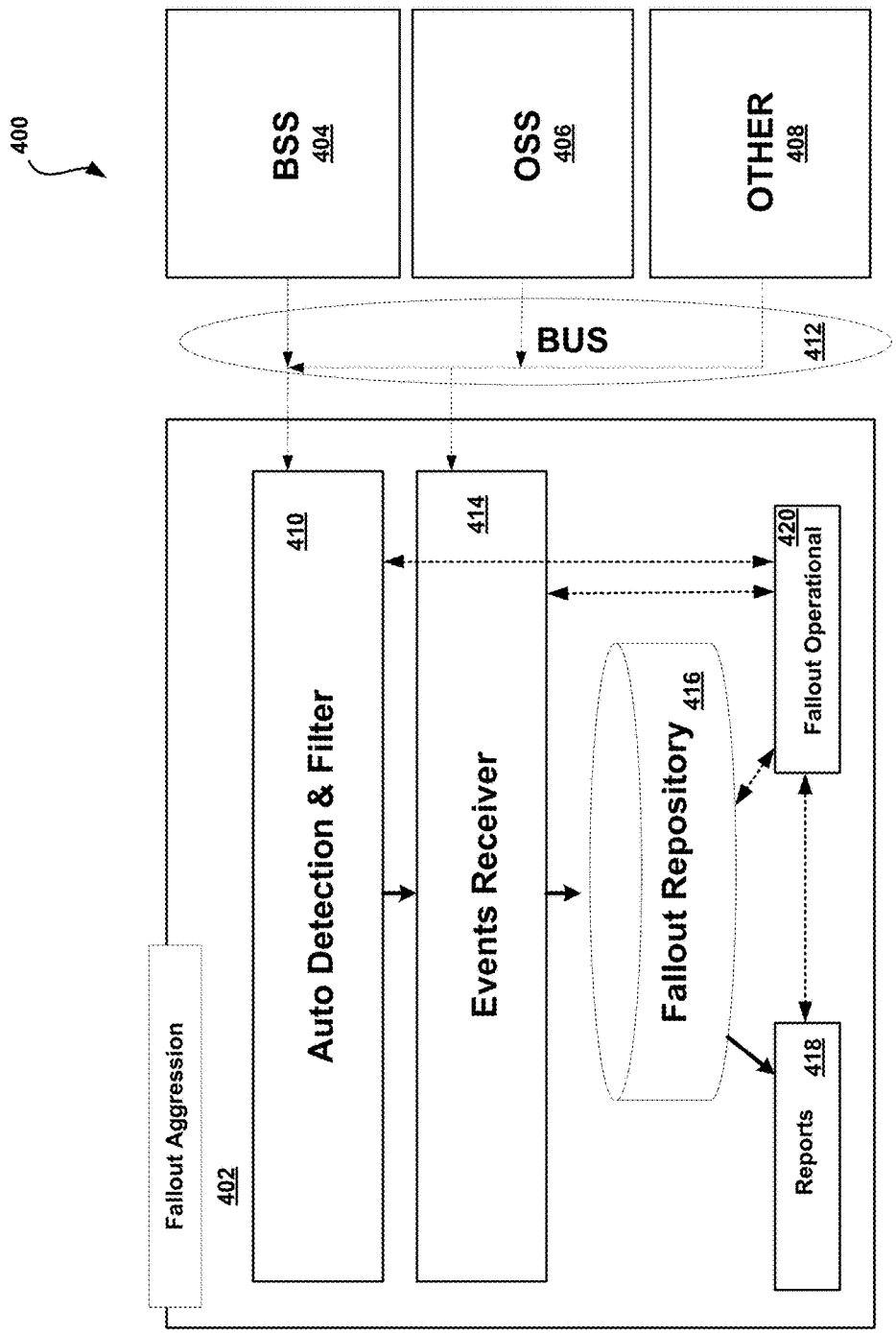
FIG. 4 illustrates an ordering system for aggregating fallouts, in accordance with one embodiment.

FIG. 4 illustrates an ordering system 400 for aggregating fallouts, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the system 400 includes a fallout aggregation system 402. The fallout aggregation system 402 is in communication with business support systems (BSS) 404, operation support systems (OSS) 406, and other service provider systems (other) 408 to identify order fallout. As shown in FIG. 4, the fallout aggregation system 402 includes an automatic detection and filter module 410 operative to detect fallouts in any of the elements of the ordering system 400, whereby fallout information is received from the ordering system 400 via a BUS interface 412.

The automatic detection and filter module 410 monitors the ordering systems and identifies fallouts using various different technologies and resources, such as agents installed on the monitored systems. For example, automatic agents may function to monitor, in real time, transactions executed in the system 400 and proactively raise an event in case of a problem. This may be achieved, for example, by using byte code injection in java based systems.

In one embodiment, log files and error files may be utilized to monitor the system 400. For example, the log files and error files may contain information on problems that occur. The information in the files may be used in certain cases and systems to realize that there is a problem, and to provide sufficient information regarding the problem and context.

In another embodiment, database tables may be utilized to monitor the system 400. For example, the system 400 may log problems that occur in a database. In other frequent situations, problem occurrences may be deduced from searching across one or more database tables for specific scenarios, even though no system has logged a clear indication in the database of a fallout occurrence.

In another embodiment, periodic testing may be utilized to monitor the system 400. For example, for problems such as connectivity, a periodic test may be performed and a failure may indicate a connectivity problem.

In another embodiment, an API invocation may be utilized to monitor the system 400. For example, in some cases, monitored systems may expose APIs for querying information on process statuses, or information that can assist in deducing that a certain fallout has occurred. In one embodiment, such APIs may be invoked, and the information gathered from them may lead to creation of fallout events.

In one embodiment, the fallout aggregation system 402 may also include an events receiver 414 operative to receive and analyze events received from the elements of the ordering system 400, and a fallout repository 416 for storing the details of detected fallouts. In one embodiment, the fallouts may be displayed to an operator of the system 400 in the form of reports 418, and may also be forwarded to an operational department 420 tasked with resolving the fallouts.

Thus, in one embodiment, the system 400 may function to collect fallout data from multiple resources that are part of a telecommunications service provider ordering system. The collection of data may be achieved by employing various technologies in a non-intrusive manner so that an operations team can analyze and address issues using a suitable solution process.

This implementation functions to provide a centralized view of status of all current fallouts in a service provider ordering system, in which the status may be aggregated from multiple systems. This may be achieved by monitoring the end-to-end lifecycle of an order from the order capture through service activation in the network.

Figure 5:
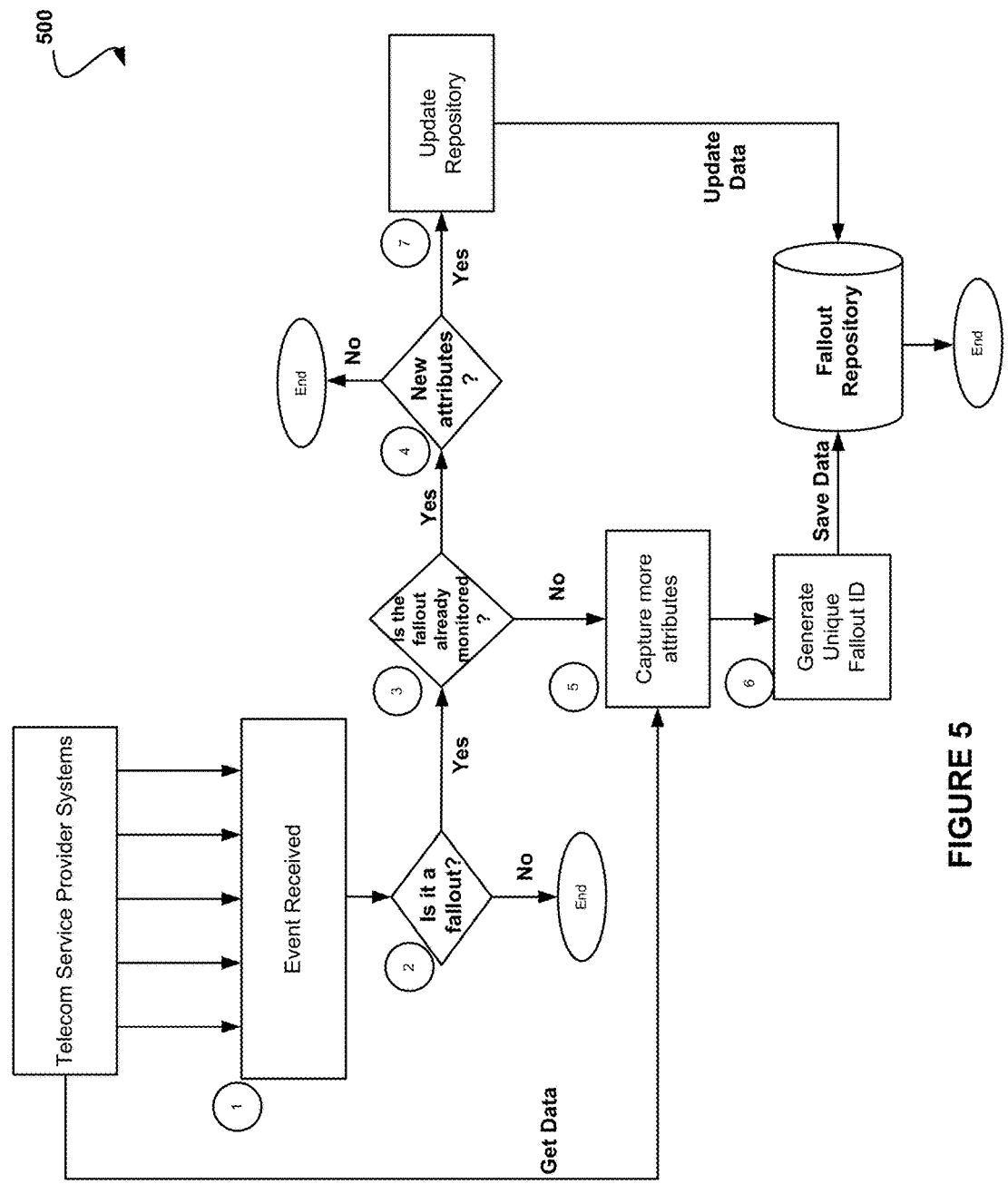
FIG. 5 illustrates a flow diagram for aggregating fallouts for the system of FIG. 4, in accordance with one embodiment.

FIG. 5 illustrates a flow diagram 500 for aggregating fallouts for the system of FIG. 4, in accordance with one embodiment. As an option, the flow diagram 500 may be implemented in the context of the details of FIGS. 1-4. Of course, however, the flow diagram 500 may be implemented in the context of any desired environment. Further, the aforementioned definitions may equally apply to the description below.

As shown, an event is received that is suspected as being related to a fallout by an analysis performed by the automatic detection and filter module 410 of FIG. 4. See step 1. Alternatively, the event may have been received by the events receiver 414 of FIG. 4. It is appreciated that ordering systems may be pre-configured to send fallout related events to the events receiver 414 of FIG. 4.

After the event is received, the automatic detection and filter module 410 analyzes the fallout to determine if the event relates to an actual fallout that needs to be stored in the fallout repository 416 or if the event is merely an informational message that the system can ignore. See step 2 of FIG. 5.

If the system identifies that the event relates to an actual fallout error, another check is performed to see if this error has already been identified by the fallout aggregation system 402, by comparing an order ID and a fallout type of the fallout with those of fallouts stored in the repository 416. See step 3 of FIG. 5. This may happen because the same error may be identified by different resources employed by the fallout aggregation system 402 to monitor a particular system, or because the fallout aggregation system 402 receives an error related to a specific order from multiple systems.

If the fallout is already stored, a new check is performed and the fallout aggregation system 402 will verify whether new attributes that are related to the fallout were received together with the event and will update the fallout repository 416 with the new data. See step 4 and step 7.

If the fallout was not previously monitored, the fallout aggregation system 402 will retrieve, from the ordering systems, additional data which relates to the specific order, such as a customer ID, a customer name and a service type, by using APIs or database queries, or by analyzing events received by the events receiver 414. See step 5. Subsequently, a unique fallout ID for the fallout is generated, and all the relevant information is then saved in the fallout repository 416. See step 6.

The fallout aggregation system 402 may be operative to ascertain that multiple fallouts reported by various systems of a service provider actually relate to a single failure, thereby allowing an operator of the system to focus on solving one issue that is causing the multiple fallouts.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:

in an ordering system that includes a plurality of resources, processing orders for one or more services using the resources;

executing software agents installed on the resources to monitor the resources to automatically detect, by the ordering system, a plurality of fallout events occurring on the resources and each capable of causing a fallout error within the ordering system which prevents one of the orders from being completed, the monitoring including:

monitoring transactions, in real time, executing in the ordering system to detect the fallout events, utilizing one or more log files and error files associated with the ordering system to detect the fallout events, searching across a plurality of database tables associated with the ordering system to identify one or more predetermined scenarios from which the fallout events are deduced, and performing periodic testing of the ordering system to detect the fallout events;

processing, by the ordering system, the detected fallout events including for each of the detected fallout events:

(a) determining, by the ordering system, whether the detected fallout event caused an actual fallout error within the ordering system which prevented one of the orders from being completed, (b) responsive to determining that the detected fallout event caused an actual fallout error within the ordering system:

(1) determining whether the fallout error, which was detected by the ordering system from a first one of the resources as a result of the fallout event, is a duplicate of a fallout error that has already been stored in a fallout repository responsive to another fallout event being detected by the ordering system from a second one of the resources, (2) responsive to determining that the fallout error is the duplicate of the fallout error that has already been stored in the fallout repository, storing with the fallout error already stored in the fallout repository any attributes received with the fallout event detected from the first one of the resources that are not already stored with the fallout error in the fallout repository, (3) responsive to determining that the fallout error is not the duplicate of the fallout error that has already been stored in the fallout repository, storing the fallout error in the fallout repository with the attributes received with the fallout event detected from the first one of the resources, (c) responsive to determining that the detected fallout event did not cause an actual fallout error within the ordering system, the ordering system identifies the fallout event as an informational message and ignores the fallout event; and after processing the detected fallout events, sending, by the ordering system, a request to resolve fallout errors stored in the fallout repository.

2. The computer program product of claim 1, wherein the monitoring the resources to automatically detect, by the ordering system, the plurality of fallout events further includes:

invoking one or more APIs for querying information to automatically detect the fallout events.

3. A method, comprising:
in an ordering system that includes a plurality of resources, processing orders for one or more services using the resources;
executing software agents installed on the resources to monitor the resources to automatically detect, by the ordering system, a plurality of fallout events occurring on the resources and each capable of causing a fallout error within the ordering system which prevents one of the orders from being completed, the monitoring including:
monitoring transactions, in real time, executing in the ordering system to detect the fallout events,
utilizing one or more log files and error files associated with the ordering system to detect the fallout events,
searching across a plurality of database tables associated with the ordering system to identify one or more predetermined scenarios from which the fallout events are deduced, and
performing periodic testing of the ordering system to detect the fallout events;
processing, by the ordering system, the detected fallout events including for each of the detected fallout events:
(a) determining, by the ordering system, whether the detected fallout event caused an actual fallout error within the ordering system which prevented one of the orders from being completed,
(b) responsive to determining that the detected fallout event caused an actual fallout error within the ordering system:
(1) determining whether the fallout error, which was detected by the ordering system from a first one of the resources as a result of the fallout event, is a duplicate of a fallout error that has already been stored in a fallout repository responsive to another fallout event being detected by the ordering system from a second one of the resources,
(2) responsive to determining that the fallout error is the duplicate of the fallout error that has already been stored in the fallout repository, storing with the fallout error already stored in the fallout repository any attributes received with the fallout event detected from the first one of the resources that are not already stored with the fallout error in the fallout repository,
(3) responsive to determining that the fallout error is not the duplicate of the fallout error that has already been stored in the fallout repository, storing the fallout error in the fallout repository with the attributes received with the fallout event detected from the first one of the resources,
(c) responsive to determining that the detected fallout event did not cause an actual fallout error within the ordering system, the ordering system identifies the fallout event as an informational message and ignores the fallout event; and
after processing the detected fallout events, sending, by the ordering system, a request to resolve fallout errors stored in the fallout repository.

4. The method of claim 3, wherein the monitoring the resources to automatically detect, by the ordering system, the plurality of fallout events further includes:
invoking one or more APIs for querying information to automatically detect the fallout events.

5. A fallout aggregation system comprising:
a memory system of an ordering system that includes a plurality of resources; and
one or more processing cores of the ordering system coupled to the memory system and that are each configured for:
processing orders, in the ordering system, for one or more services using the resources;
executing software agents installed on the resources to monitor the resources to automatically detect, by the ordering system, a plurality of fallout events occurring on the resources and each capable of causing a fallout error within the ordering system which prevents one of the orders from being completed, the monitoring including:
monitoring transactions, in real time, executing in the ordering system to detect the fallout events,
utilizing one or more log files and error files associated with the ordering system to detect the fallout events,
searching across a plurality of database tables associated with the ordering system to identify one or more predetermined scenarios from which the fallout events are deduced, and
performing periodic testing of the ordering system to detect the fallout events;
processing, by the ordering system, the detected fallout events including for each of the detected fallout events:
(a) determining, by the ordering system, whether the detected fallout event caused an actual fallout error within the ordering system which prevented one of the orders from being completed,
(b) responsive to determining that the detected fallout event caused an actual fallout error within the ordering system:
(1) determining whether the fallout error, which was detected by the ordering system from a first one of the resources as a result of the fallout event, is a duplicate of a fallout error that has already been stored in a fallout repository responsive to another fallout event being detected by the ordering system from a second one of the resources,
(2) responsive to determining that the fallout error is the duplicate of the fallout error that has already been stored in the fallout repository, storing with the fallout error already stored in the fallout repository any attributes received with the fallout event detected from the first one of the resources that are not already stored with the fallout error in the fallout repository,
(3) responsive to determining that the fallout error is not the duplicate of the fallout error that has already been stored in the fallout repository, storing the fallout error in the fallout repository with the attributes received with the fallout event detected from the first one of the resources,
(c) responsive to determining that the detected fallout event did not cause an actual fallout error within the ordering system, the ordering system identifies the fallout event as an informational message and ignores the fallout event; and
after processing the detected fallout events, sending, by the ordering system, a request to resolve fallout errors stored in the fallout repository.

6. The fallout aggregation system of claim 5, wherein the monitoring the resources to automatically detect, by the ordering system, the plurality of fallout events further includes:

invoking one or more APIs for querying information to automatically detect the fallout events.

\* \* \* \* \*